S. RITTY.
HORSE HAY-RAKES.
No. 193,832.  Patented Aug. 7, 1877.
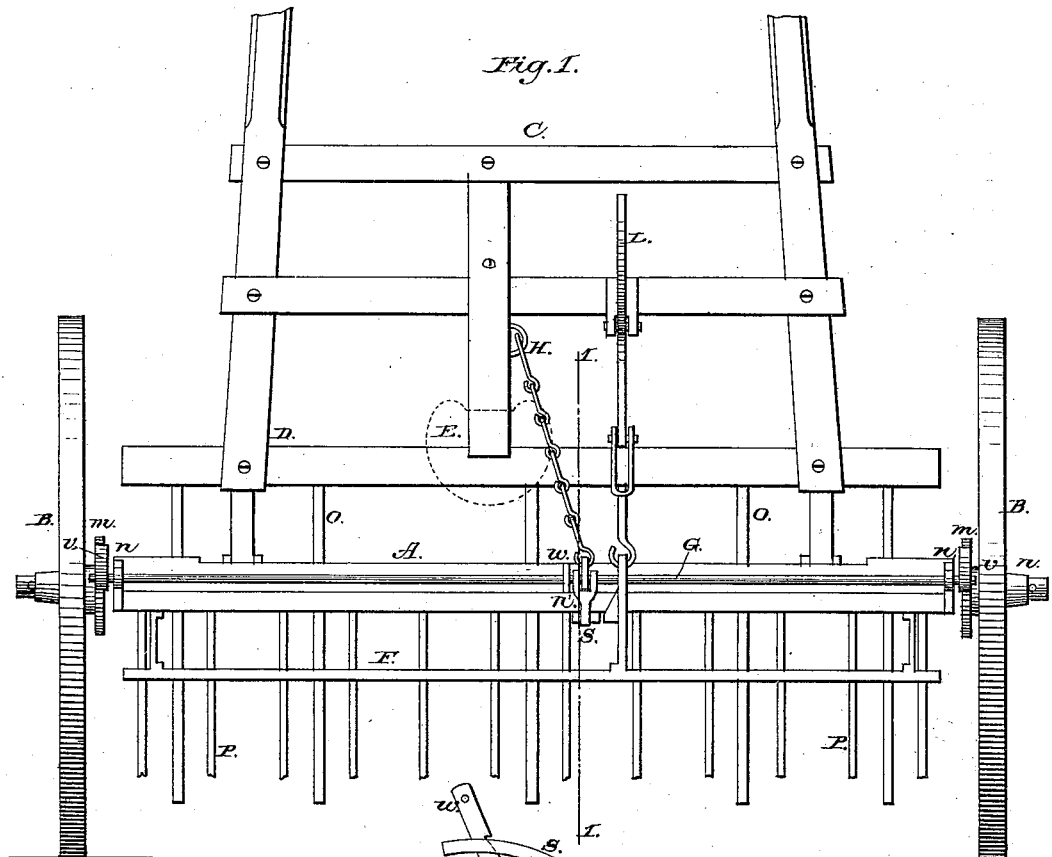
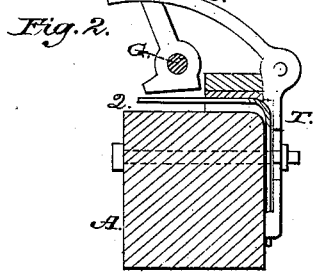
Attest:
B. Pickering
Wilmer H. Bellville
Inventor:
Sebastian Ritty

UNITED STATES PATENT OFFICE.

SEBASTIAN RITTY, OF DAYTON, OHIO, ASSIGNOR OF ONE-THIRD HIS RIGHT TO JOHN DODDS, OF SAME PLACE.

IMPROVEMENT IN HORSE HAY-RAKES.

Specification forming part of Letters Patent No. 193,832, dated August 7, 1877; application filed August 18, 1876.

*To all whom it may concern:*

Be it known that I, SEBASTIAN RITTY, of the city of Dayton, State of Ohio, have invented Improvements in Horse-Rakes, of which the following is a specification:

My invention pertains to that class of horse-rakes in which there is a partial rotation of the axle in discharging the grain, the invention being exclusively a device for this purpose.

The accompanying drawings are made a part of my specification, in which the same letters designate like parts.

Figure 1 is a top view of the horse-rake. Fig. 2 is a cross-section on the line 1 1.

The general features of the horse-rake are similar to those in general use, and therefore a detailed description is unnecessary.

A represents the axle; B, the wheels, and C the shafts. The rake-teeth P are hinged directly to the axle, and pass through the guide-board F, which guide is supported by three arms bolted to the rear of the axle. To the cross-bar D are attached the cleaner-sticks O. The hand-lever L, with its attachments, is used to effect the discharge, or to hold with the aid of the foot the rake-teeth to the ground.

The shafts are hinged to the bottom of the axle. E is the bar which supports the seat, the position of which is indicated by dotted lines. The chain H is connected to a staple on this bar, and the other end connects with the arm $w$. To the wheels are attached the ratchet-wheels $m$. The iron rod G is held by three supports, $n$ $n'$, just above and near the center of the axle. On each end, and directly over the ratchet-wheels, are secured the pawls or dogs $v$, which engage the said wheels. Near the central support is attached the arm $w$, Fig. 2. The effect of carrying this arm forward is to cause the pawls to engage the ratchet-wheels. The rear edge is notched for the engagement of the gravitating-latch S, which is slotted, so as to embrace the operating-arm.

This catch is pivoted to the plate T, which is bolted onto the axle. The bolt passes through a lengthened slot, both of the plate and the flat steel spring Q, which lies within a vertical groove of the plate. The free end of the spring has a bearing against the under surface of the operating-arm, and the effect is to keep the arm in a nearly vertical position, and thereby hold the pawls clear of the ratchet-wheels. When the spring becomes weakened by use, the bolt may be released and the spring raised, and thereby made to exert a greater pressure. The plate carrying the gravitating-latch being adjustable vertically, the pawls are readily adjusted to the ratchet-wheels. This adjustment is not essential, as the pawls are readily adjusted on the torsion-rod. When the rake is driven on a curve, the pawl on the inner circle is relieved by the torsion of the rod.

The operation of discharging the grain may be described thus: The driver, by pressing his foot on the chain, carries forward the operating-arm, and simultaneously the pawls engage the ratchet-wheels and the gravitating-latch the arm, the wheels thereby elevating the teeth and causing the grain to fall out. The upward movement of the teeth continues until the gravitating-latch comes in contact with the cross-bar, which releases the pawls, and the teeth fall back into position to resume the operation of raking.

What I claim as my invention is—

The combination of the arm $w$, supported on a rod for operating pawls with reference to ratchet-wheels, the gravitating-latch S, for holding said arm during discharge, the adjustable spring Q, for holding the pawls clear of said ratchet-wheels when not required in discharging a horse-rake, substantially as set forth.

SEBASTIAN RITTY.

Witnesses:
B. PICKERING,
WILMER H. BELVILLE.